United States Patent
Huan (10) Patent No.: US 8,150,446 B2
(45) Date of Patent: Apr. 3, 2012

(54) THERMAL ENERGY CONTROL IN A MOBILE TRANSCEIVER

(75) Inventor: Hong Xin George Huan, Chapel Hill, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 427 days.

(21) Appl. No.: 12/486,462

(22) Filed: Jun. 17, 2009

(65) Prior Publication Data

US 2010/0323743 A1 Dec. 23, 2010

(51) Int. Cl.
*H04B 7/00* (2006.01)
*H04B 1/00* (2006.01)
*H04B 1/16* (2006.01)

(52) U.S. Cl. ........ 455/522; 455/69; 455/343.1; 455/450

(58) Field of Classification Search .................. 455/101, 455/522, 69, 127.1, 343.1, 450
See application file for complete search history.

(56) References Cited

U.S. PATENT DOCUMENTS

| | | | |
|---|---|---|---|
| 5,574,977 A * | 11/1996 | Joseph et al. ................. | 455/450 |
| 5,768,267 A * | 6/1998 | Raith et al. .................... | 370/329 |
| 5,848,062 A * | 12/1998 | Ohno ............................. | 370/311 |
| 5,875,187 A * | 2/1999 | Amin et al. .................... | 370/337 |
| 5,930,233 A * | 7/1999 | Kanerva et al. ................ | 370/231 |
| 6,760,311 B1 * | 7/2004 | Raith ............................. | 370/252 |
| 6,891,800 B1 | 5/2005 | Vollmer et al. | |
| 7,480,269 B2 * | 1/2009 | Heo et al. ...................... | 370/328 |
| 7,706,346 B2 * | 4/2010 | Huo et al. ...................... | 370/342 |
| 7,821,977 B2 * | 10/2010 | Kim et al. ...................... | 370/311 |
| 7,860,018 B2 * | 12/2010 | Raith ............................. | 370/252 |
| 7,978,088 B2 * | 7/2011 | Black et al. ................. | 340/636.2 |
| 7,991,437 B2 * | 8/2011 | Camuffo et al. .............. | 455/574 |
| 2005/0113103 A1 * | 5/2005 | Snowden et al. .............. | 455/451 |

FOREIGN PATENT DOCUMENTS

| | | |
|---|---|---|
| EP | 1 478 107 A2 | 11/2004 |
| EP | 1 622 286 A1 | 2/2006 |
| WO | WO 2004/068738 A1 | 8/2004 |

* cited by examiner

*Primary Examiner* — Tilahun B Gesesse (57) ABSTRACT

A method and apparatus for controlling thermal energy generation in a User Equipment (UE) operating in a radio telecommunication network. The thermal energy generation is directly proportional to a transmit power level in the UE, and a Node B allocates transmit power levels to a plurality of UEs through scheduling grants. Upon request by the UE, the Node B allocates a dedicated scheduling grant to the UE authorizing a higher transmit power. If the UE subsequently overheats, it sends a power reduction request to the Node B. Upon approval, all or part of the dedicated grant is removed, and the UE transmits at a lower power level to reduce thermal generation. The Node B retains control of the grant and may reallocate it to a common scheduling grant or may allocate another dedicated grant to a different UE.

1 Claim, 5 Drawing Sheets

THERMAL ENERGY CONTROL IN A MOBILE TRANSCEIVER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to radio telecommunication systems. More particularly, and not by way of limitation, the present invention is directed to an apparatus and method for controlling the generation of thermal energy in a mobile transceiver operating in a radio telecommunication system.

Advanced multimedia applications and fast mobile data access requirements place increasing demands on new generations of mobile devices such as User Equipments (UEs) in WCDMA networks. To meet these demands, UEs are equipped with advanced ASIC architectures with increased processing speed and complexity. However, the improvement of the performance and capacities also leads to new issues, such as excessive power consumption, generation of excessive thermal energy, and high cost.

High data rate applications in the UE require that the UE transmit at a higher power level to support the higher data rate. Uplink power control is specified by the 3GPP standard (3GPP TS 25.211). Under the standard, the UE can request an increase in the allocated scheduling grant from the serving Node B to thereby support a high data rate application.

BRIEF SUMMARY OF THE INVENTION

A shortcoming of the uplink power control procedures specified by 3GPP TS 25.211 is that there is no provision enabling the UE to notify the Node B that the power grant is too high. This would be advantageous when the UE is required to reduce transmission power, for example, when it is overheating. It would be advantageous to have a system and method for controlling the generation of thermal energy in a mobile transceiver that also informs the network of an excess scheduling grant so that the scheduling grant can be reclaimed and allocated to other users. The present invention provides such an apparatus and method.

Thus, in one aspect, the present invention is directed to a method of controlling thermal energy generation in a first mobile transceiver operating in a radio telecommunication network. The thermal energy generation is directly proportional to a transmit power level in the first mobile transceiver, and a network node allocates transmit power levels to a plurality of mobile transceivers through scheduling grants. The method includes the steps of initially allocating by the network node, a higher transmit power authorization for the first mobile transceiver than for others of the plurality of mobile transceivers; subsequently receiving by the network node, a request from the first mobile transceiver to decrease transmit power due to an overheat condition in the mobile transceiver; removing by the network node, a portion of the transmit power authorization from the first mobile transceiver in response to the request to decrease transmit power; and reallocating by the network node, the transmit power authorization removed from the first mobile transceiver to the plurality of mobile transceivers.

In another aspect, the present invention is directed to a method of controlling thermal energy generation in a first mobile transceiver operating in a radio telecommunication network. The method includes the steps of allocating by the network node, a first common scheduling grant to the plurality of mobile transceivers, the first common scheduling grant authorizing each of the mobile transceivers to transmit at a first common power level; receiving by the network node, a request from the first mobile transceiver to increase transmit power; and allocating by the network node, a dedicated scheduling grant to the first mobile transceiver in response to the request to increase transmit power, the dedicated scheduling grant authorizing the first mobile transceiver to transmit at a higher dedicated transmit power level. The network node then allocates a second common scheduling grant to mobile transceivers other than the first mobile transceiver, the second common scheduling grant authorizing each of the mobile transceivers to transmit at a second common power level lower than the first common power level and offsetting the dedicated grant allocated to the first mobile transceiver. The method also includes subsequently receiving by the network node, a request from the first mobile transceiver to decrease transmit power due to an overheat condition in the mobile transceiver; removing by the network node, the dedicated scheduling grant from the first mobile transceiver in response to the request to decrease transmit power; and allocating by the network node, a third common scheduling grant to the plurality of mobile transceivers, the third common scheduling grant authorizing each of the mobile transceivers to transmit at a third common power level higher than the second common power level and reallocating the dedicated grant within the third common scheduling grant.

In yet another aspect, the present invention is directed to a network node for controlling thermal energy generation in a first mobile transceiver operating in a radio telecommunication network. The thermal energy generation is directly proportional to a transmit power level in the first mobile transceiver, and the network node allocates transmit power levels to a plurality of mobile transceivers through scheduling grants. The network node includes a receiver for receiving requests from the first mobile transceiver to increase transmit power to meet application requirements and to decrease transmit power due to an overheat condition in the mobile transceiver. The network node also includes a power allocation processor for allocating a dedicated scheduling grant to the first mobile transceiver in response to a request to increase transmit power, and for removing the dedicated scheduling grant from the first mobile transceiver in response to a request to decrease transmit power.

In yet another aspect, the present invention is directed to a method performed in a mobile transceiver for controlling thermal energy generation in the mobile transceiver. The method includes the steps of initially requesting and obtaining by the mobile transceiver, a dedicated scheduling grant authorizing a higher transmit power level than authorized for other mobile transceivers; transmitting by the mobile transceiver at the higher transmit power level for a period of time; subsequently detecting by the mobile transceiver, that the mobile transceiver is overheating; sending a power reduction request from the mobile transceiver to the network node in response to detecting that the mobile transceiver is overheating; and upon receiving an approval from the network node, removing at least part of the dedicated grant by the mobile transceiver and transmitting at a lower transmit power level to reduce thermal generation in the mobile transceiver.

In yet another aspect, the present invention is directed to an apparatus in a mobile transceiver for controlling thermal energy generation in the mobile transceiver, wherein the thermal energy generation is directly proportional to a transmit power level in the mobile transceiver, and a network node allocates transmit power levels to a plurality of mobile transceivers through scheduling grants. The apparatus includes a transmitter for transmitting to the network node, requests to increase transmit power to meet application requirements and to decrease transmit power due to an overheat condition in the mobile transceiver; a power control processor; and a thermal sensor for sensing the overheat condition and sending an indication of the overheat condition to the power control processor. Upon receiving the indication of the overheat condition, the power control processor causes the transmitter to transmit a power reduction request to the network node. The apparatus may also include a receiver for receiving an approval of the power reduction request from the network node, wherein the power control processor causes the transmitter to transmit at a requested lower power level to reduce thermal generation in the first mobile transceiver.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

The present invention compliments the existing power grant scheduling protocol defined in the 3GPP standard (3GPP TS 25.211) by providing closed loop control of uplink power reduction for the Enhanced Uplink (EUL). The invention enables the UE to handle thermal energy management when a power reduction is necessary, and it also allows the network (e.g., UTRAN) to efficiently reclaim the unneeded resources, such as the scheduling grant. To place the invention in context, the existing procedures of 3GPP TS 25.211 are discussed below.

Figure 1:
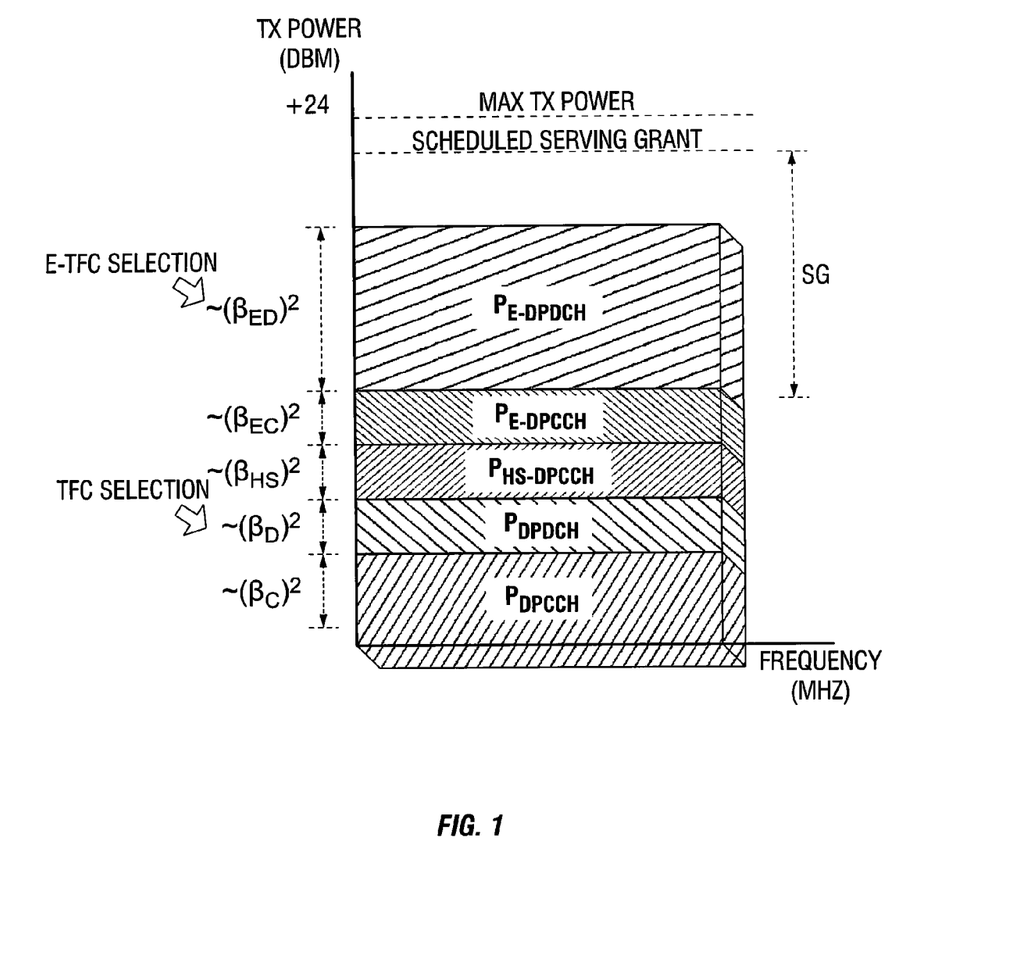
FIG. 1 is a graphical representation of the transmission power output by a UE for various uplink channels in accordance with 3GPP TS 25.211.

FIG. 1 is a graphical representation of the transmission power output by a UE for various uplink channels in accordance with 3GPP TS 25.211. The 3GPP standard defines a fast inner loop power control procedure for controlling the output power of the uplink Dedicated Physical Control Channel (DPCCH) utilizing Transmission Power Command (TPC) commands at the frequency of 1.5 KHz. However, the output power of the other uplink control channels, i.e., the High Speed DPCCH (HS-DPCCH) and the Enhanced Uplink DPCCH (E-DPCCH), and the uplink data channels, i.e., the Dedicated Physical Data Channel (DPDCH) and the Enhanced Uplink DPDCH (E-DPDCH) are statically and dynamically allocated according to the amplitude factors ($\beta_{hs}$ for HS-DPCCH, $\beta_{ec}$ for E-DPCCH, $\beta_d$ for DPDCH, and $\beta_{ed}$ for E-DPDCH) as shown in FIG. 1.

When the output power of the uplink DPCCH is changed due to the fast inner loop power control, it affects the amplitude factor for the DPCCH ($\beta_c$). The powers of the other uplink channels (DPDCH, E-DPDCH, HS-DPCCH, and E-DPCCH) are directly proportional to the square of the ratio of their amplitude factors and the amplitude factor of DPCCH, such as $(\beta_{ed}/\beta_c)^2$ for the E-DPDCH.

The output powers of the uplink data channels (DPDCH and E-DPDCH) are dynamically allocated, since their amplitude factors are determined by the Transport Format Combination (TFC) or the Enhanced Uplink Dedicated Channel TFC (E-TFC) selection. The total TX power of all of the uplink channels is limited by the maximum output power based on the power class of the UE. For the Enhanced Uplink (EUL) (3GPP TS 25.309), the E-TFC selection is also limited by the Serving Grant assigned to the UE.

With the increase in the uplink data rata for Enhanced Uplink (EUL) and the introduction of new uplink channels such as E-DPCCH and E-DPDCH, the EUL needs more robust power control so that the UE can request additional resources to support the higher data rate. The Node B may grant the request according to its scheduling algorithm which is based on load balancing, uplink noise status, and supported quality of service.

The grant scheduling protocol is based on the uplink scheduling requests from the UE to the Node B in the form of Scheduling Information and a "Happy Bit", and the downlink scheduling grants from the Node B to the UE in the form of an E-DCH Absolute Grant Channel (E-AGCH) and an E-DCH Relative Grant Channel (E-RGCH).

The Scheduling Information contains the current load information of the UE, which includes:

Logical Channel ID—ID of highest priority DTCH;
UE Buffer Occupancy—Buffer usage of the highest priority logical channel; and
UE Power Headroom—Ratio of the maximum UE transmitter power and the transmitted code power on the DPCCH.

The Schedule Information can be transmitted alone or with the uplink user data as an in-band signal of the E-DCH.

The Happy Bit is always transmitted as a bit on the uplink E-DPCCH to indicate whether the UE is satisfied with the current Serving Grant. The UE is "unhappy" if all the three following conditions are fulfilled:

The UE is transmitting the maximum data rate allowed by the Serving Grant;
The UE has more power left for transmitting at a higher data rate; and
The UE's buffer needs more than Happy_Bit_Delay_Condition ms (Configured by RRC) to be transmitted.

The UE can request the additional uplink resource from the Node B via a scheduling request in the form of Scheduling Information and the Happy Bit. Upon the reception of the Happy Bit and Scheduling Information, the Node B of the Serving radio link (RL) has the knowledge of the current load situation in the UE. The Node B evaluates the uplink interference level and decides whether the UE can be assigned more grants. The UE maintains the Serving Grant based on the scheduling grants from the Node B via the E-AGCH or E-RGCH. If more grants are assigned, the UE can use a different E-TFC selection allowed by the Serving Grant to achieve a higher data rate.

The main problem with the existing procedure for uplink power control in EUL is that it only accounts for the situation in which the UE requests a greater scheduling grant in order to support a higher data rate. The Happy Bit shows "unhappy" in order to demand more grants from the Node B so that the UE can transmit more data. This may be appropriate for most cases; however, there is a need to enable the UE to notify the Node B that the power grant is too high and to request a reduction of the scheduling grant, for example in an overheat condition.

The current 3GPP standard does not have provisions to handle thermal management in the UE, and it is not possible for the WCDMA network to know the needs of the individual UE or to take control of the power reduction from the individual UE. Additionally, if the UE releases resources such as the uplink power grant in an overheating situation, there is no effective way for the WCDMA network to reclaim the released resources.

In the present invention, thermal management of the UE generally involves reduction of the UE transmitter power upon detection of an overheat condition. The invention, which is referred to herein as Enhanced Uplink Network Assisted Power Reduction (E-NAPR), works with the grant scheduling for uplink power control in the Enhanced Uplink (3GPP TS 25.309). It enables the UE to initiate a power reduction request and achieves the transmit power reduction via the network assisted grant reduction. The present invention compliments the existing power grant scheduling protocol defined in the 3GPP standard (3GPP TS 25.211) by providing closed loop control of uplink power reduction for the Enhanced Uplink (EUL). The invention enables the UE to handle thermal energy management when a power reduction is necessary, and it also allows the network (e.g., UTRAN) to efficiently reclaim the resources released by the UE, such as the scheduling grant.

The present invention provides a closed loop protocol for the UE-initiated and network-assisted power reduction. The invention allows the UTRAN to have complete knowledge concerning the load condition of the UE so that the UTRAN can efficiently schedule the resources. The invention also provides thermal management for the UE. For the UE, the increased data throughput leads to thermal problems in the radio transmitters since it requires additional output power. With the UTRAN involved with the uplink power reduction for the UE, the thermal management is more efficient and simpler to implement.

In one embodiment, a new in-band request signal "Power Reduction REQ" is utilized. The Power Reduction request signal may be sent standalone or as part of the E-DCH. When the UE detects an overheat condition and decides that it is necessary to reduce the output power, the UE sends the Power Reduction signal on its serving RL to the Node B.

This embodiment also utilizes a dedicated grant scheduling and a common grant scheduling based on the primary and secondary Enhanced Uplink Radio Network Temporary Identifier (E-RNTI). The primary and secondary E-RNTI are allocated by the Node B of the serving RL. The primary E-RNTI serves as a unique ID for the UE within the serving RL, and the secondary E-RNTI is used as a group ID for the group of UEs within the same serving RL. The primary E-RNTI is used to assign a primary absolute grant (E-AGCH) for the individual UE, and the secondary E-RNTI is used to assign secondary absolute grants (also E-AGCH) for the group of UEs with the same secondary E-RNTI so that they can perform unscheduled data transmissions.

Figure 2:
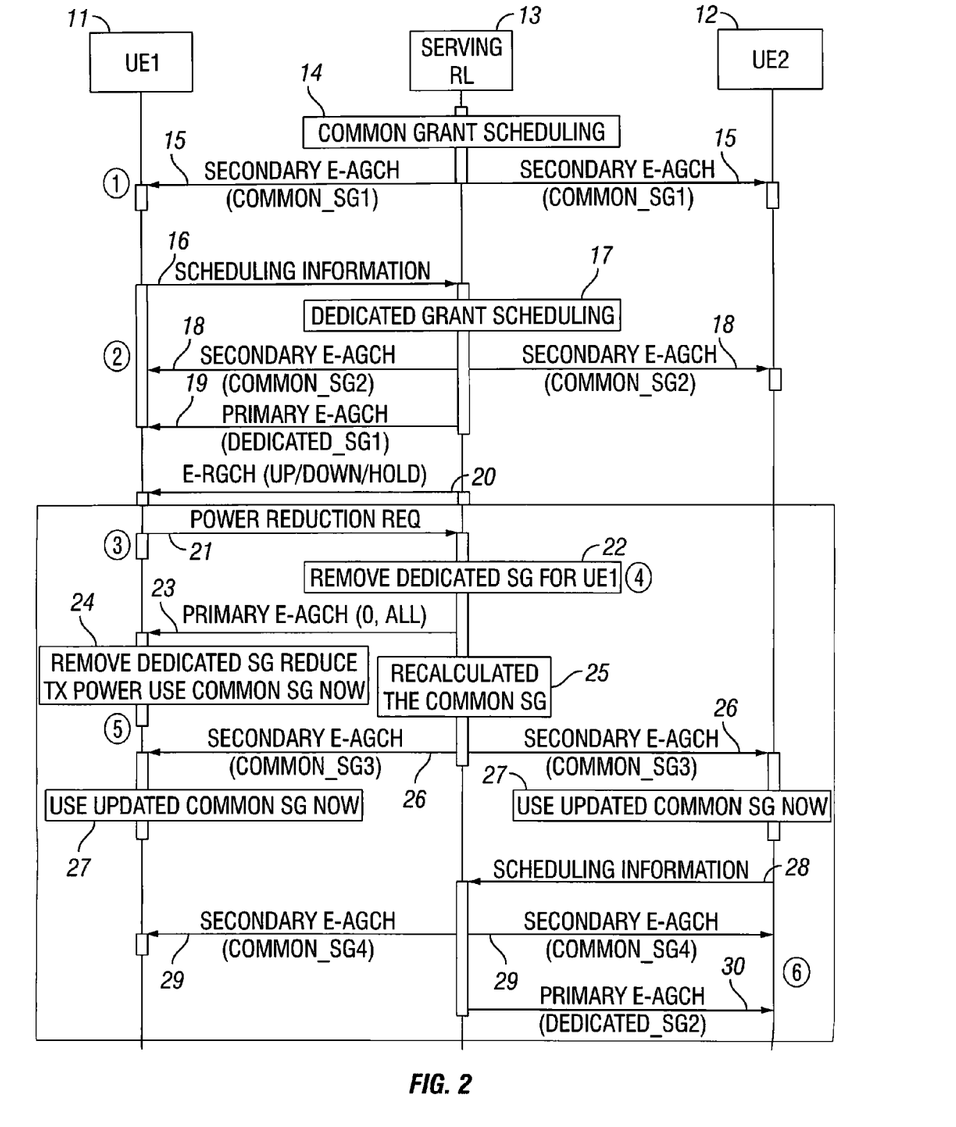
FIG. 2 is a sequence diagram illustrating an exemplary embodiment of the method of the present invention.

FIG. 2 is a sequence diagram illustrating an exemplary embodiment of the method of the present invention. New procedures are shown in the box containing steps 21-29. In this exemplary scenario, there are two UEs, UE1 (11) and UE2 (12), in the same Serving RL (13) (also referred to as the Node B). The two UEs have the same secondary E-RNTI. At step 14, the Node B of the Serving RL performs the common grant scheduling and determines what Common_SG1 should be used. At step 15, the Node B sends the Common_SG1 as a part of the Secondary E-AGCH to UE1 and UE2. The UEs then use the Common_SG1 as the serving grant.

When UE1 11 has a large quantity of data to transmit and it has used the entire serving grant allocated, UE1 sends Scheduling Information and E-PDCCH at step 16 with the Happy Bit to set to "unhappy". At step 17, the Node B 13 performs dedicated grant scheduling and decides that it can allocate a dedicated grant to UE1. At step 18, the Node B first updates the Common_SG1 to a Common_SG2 (normally smaller to make room for the new dedicated grant for UE1) for all the UEs with the same secondary E-RNTI. At step 19, the Node B sends a Dedicated_SG1 via the primary E-AGCH to UE1. UE1 is now using the higher serving grant, which means that UE1 can use a higher E-TFC selection to transmit more data quickly.

Since the higher data rate means UE1 11 transmits at a higher output power, the scenario assumes that UE1 overheats at a future time. In order to reduce the thermal energy from the transmitter, UE1 needs to reduce the transmitter output power. At step 21, UE1 sends a new "Power Reduction REQ" request in-band signal to the Node B 13. At step 22, the Node B uses the parameters in the Power Reduction REQ and its own scheduling algorithm to perform the power reduction. In this scenario, it is assumed that the entire dedicated grant for UE1 needs to be removed. At step 23, the Node B sends the primary E-AGCH with "INACTIVE" and all scopes. At step 24, UE1 removes the dedicated grant, switches back to the secondary E-RNTI, and uses the Common_SG2 as its serving grant. At step 25, the Node B then recalculates the Common_SG and at step 26, sends a Common_SG3 as a part of the Secondary E-AGCH to UE1 and UE2. At step 27, the UE1 11 and UE2 12 then use the Common_SG3 as the serving grant.

In this scenario, it is assumed that UE2 12 later needs a dedicated data access requiring a higher scheduling grant. It is possible for the network to satisfy this need since UE1 11 has released its dedicated grant. At step 28, UE2 sends Scheduling Information to the Node B 13 with the Happy Bit to set to "unhappy". The Node B 13 performs dedicated grant scheduling and allocates a dedicated grant to UE2. At step 29, the Node B first updates the Common_SG3 to a Common_SG4 (normally smaller to make room for the new dedicated grant for UE2) for all the UEs with the same secondary E-RNTI. At step 30, the Node B sends a Dedicated_SG2 via the primary E-AGCH to UE2. UE2 is now using the higher serving grant, which means that UE2 can use a higher E-TFC selection to transmit more data quickly.

Figure 3:
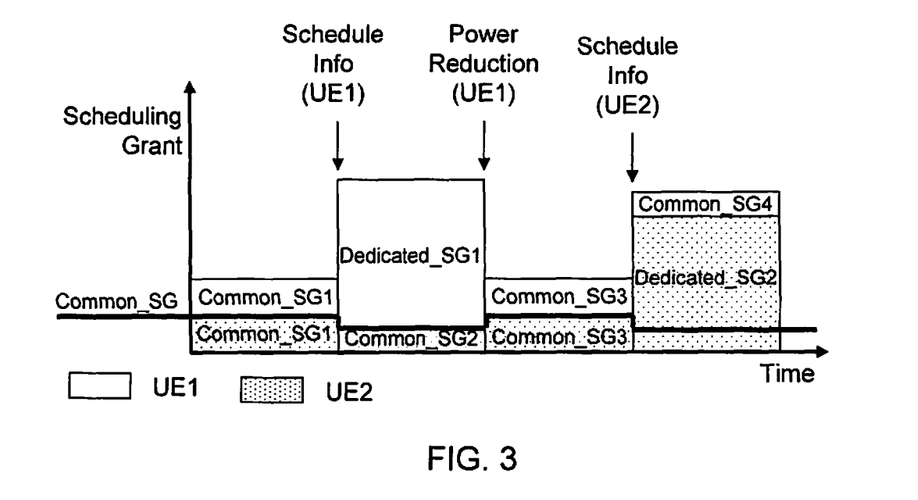
FIG. 3 is a graphical representation of the varying scheduling grants to UE1 11 and UE2 12 during the scenario illustrated in FIG. 2.

FIG. 3 is a graphical representation of the varying scheduling grants to UE1 11 and UE2 12 during the scenario illustrated in FIG. 2. The figure shows the total scheduling grant, the division of the grant between UE1 and UE2, and the Common_SG at any time during the scenario.

Figure 4:
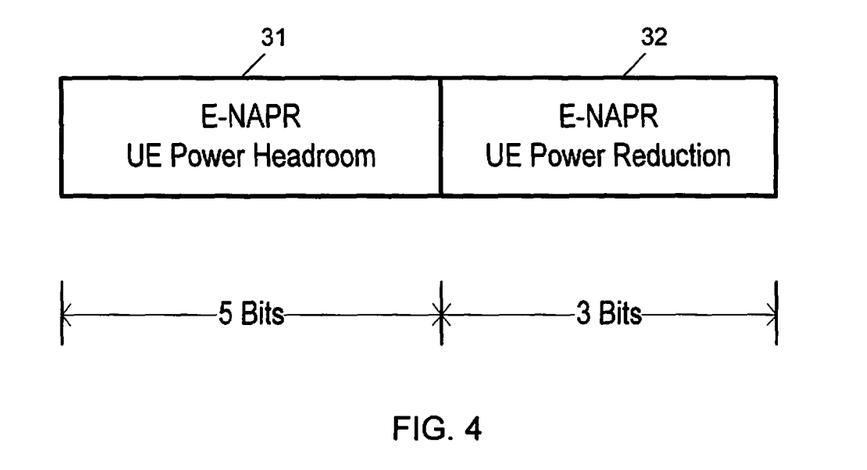
FIG. 4 is an illustration of an exemplary Packet Data Unit (PDU) format of a new "Power Reduction REQ" in-band signal.

FIG. 4 is an illustration of an exemplary Packet Data Unit (PDU) format of the new "Power Reduction REQ" in-band signal. An embodiment of the present invention requires the UE to be modified to transmit the "Power Reduction REQ" in-band signal. The signal may be transmitted standalone, or as part of the E-DCH. The E-NAPR UE Power Headroom bits 31 convey the ratio of the maximum UE Transmit Power and the transmitted code power on the DPCCH (in dB). The E-NAPR UE Power Reduction bits 32 convey the requested amount of power reduction for the dedicated scheduling grant (in dB).

When E-NAPR UE Power Reduction 32 is not zero, the Node B sends the primary E-AGCH with a reduced "Absolute Grant Value" from the previous grant value, but keeps the UE in the dedicated scheduling. When the E-NAPR UE Power Reduction is zero, the Node B sends the primary E-AGCH with "Absolute Grant Value=0". Upon reception of this primary E-AGCH, the UE stops all HARQ processes and moves back to the common scheduling grant. Thus, the UE loses all the dedicated grant level that it received from its primary E-RNTI, and its serving grant will be reduced.

The present invention enables the UE to initiate a power reduction in a controlled and effective way, while still maintaining the uplink power control mechanism specified in 3GPP TS 25.211. Since the Serving RL or Node B has complete knowledge of the load within the UE, the Serving RL or Node B takes control of the power reduction so that it can quickly reclaim and reuse the resource.

In this way, the present invention addresses the thermal management of the UE, which is not covered by the 3GPP standards. The invention provides an innovative way to perform thermal management for the UE by using a UE initiated and network assisted approach, which allows the network keep full control of the uplink resources while reducing the uplink power upon requests. The thermal problem, if not handled properly, would cause the UE operating temperature to rise above the maximum design temperature of the UE. This would have the following adverse effects:

Component Yield—The operational life of some UE components will be shortened.

Design Functionality—Some components may not be functional according to the specification above the maximum design temperature, adversely affecting the design functionality of the UE.

Thermal Characteristics—The UE may not be able to meet thermal requirements such maintaining the surface temperature below a design level.

Cost—To enable the UE to perform in the overheat environment and satisfy the thermal requirements, the UE may have to use more expensive components with better temperature tolerance, and additional components for cooling purposes.

Service Availability—When the UE experiences a severe thermal problem, it may trigger the shutdown procedure of the UE device to protect the UE from overheating damage. That may cause interruption of service including voice and data for the end user.

As thermal problems become more critical for UE designs, the present invention provides a new way of performing thermal management via coordinated efforts from both the UE and the network.

Figure 5:
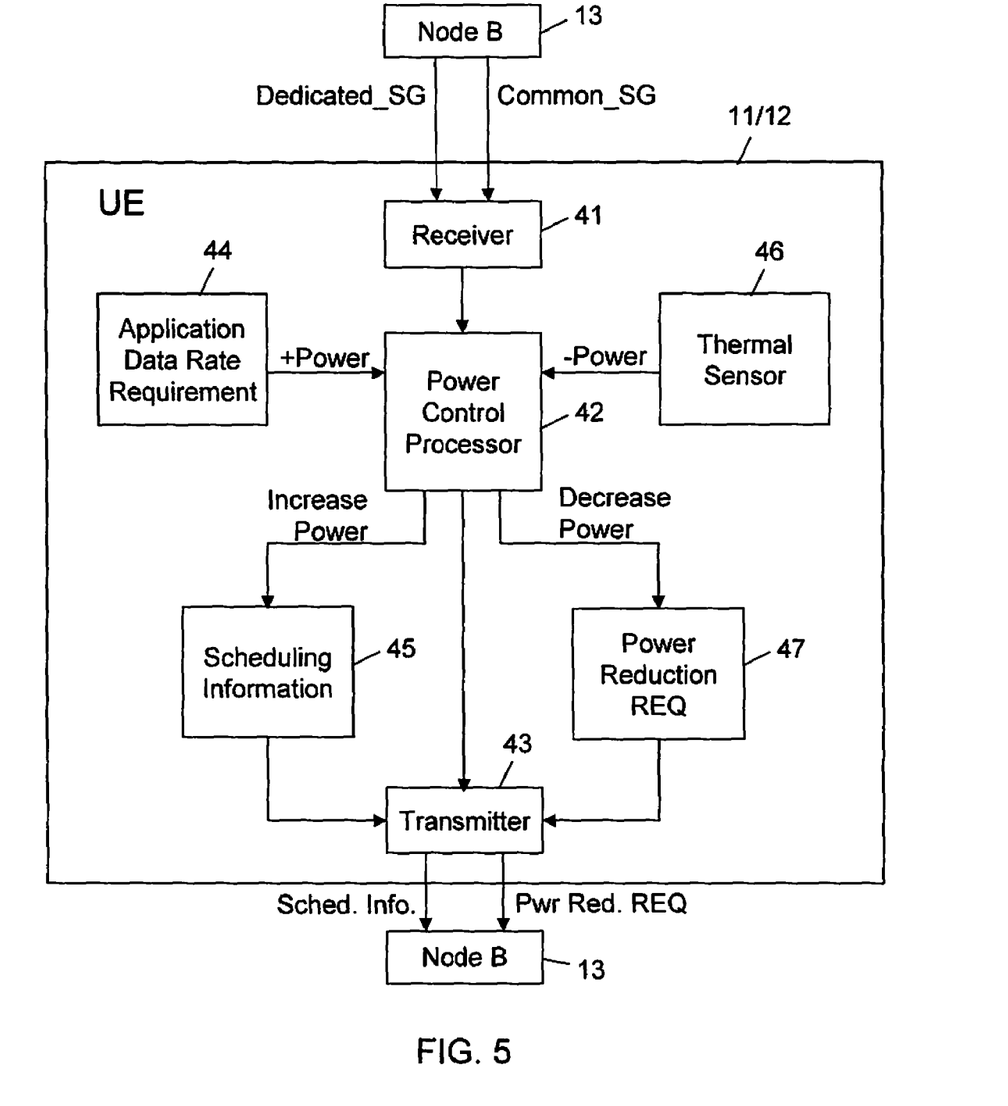
FIG. 5 is a simplified block diagram of an exemplary UE illustrating components for implementing an embodiment of the present invention.

FIG. 5 is a simplified block diagram of an exemplary UE 11/12 illustrating components for implementing an embodiment of the present invention. A receiver 41 receives the Common_SG and Dedicated_SG from the Node B 13 and provides the power level information contained therein to a power control processor 42. The power control processor controls a transmitter 43 according to the information received. When an application data rate requirement 44 requires an increase of transmitter power to support a higher data rate, the power control processor causes scheduling information 45 to be sent to the transmitter, which transmits the scheduling information to the Node B. If an increased scheduling grant is available, the Node B returns a Dedicated_SG to the UE, and the power control processor 42 causes the transmitter 43 to increase the transmission power level accordingly.

At a later time, a thermal sensor 46 may detect that the UE is in an overheat condition. The thermal sensor notifies the power control processor that a decrease of transmitter power is required for thermal management reasons. In response, the power control processor causes a Power Reduction REQ signal 47 to be generated and sent to the Node B 13. The Node B may remove the Dedicated_SG from the UE's allocation and return a Common_SG with a lower power level. The power control processor may balance the demands of the application data rate requirement 44 against the temperature reported by the thermal sensor 46. The power control processor may conclude that an intermediate power level will solve the thermal management problem while providing the highest possible data rate. In this case, the Node B may return another Dedicated_SG with a power level lower than the level previously allocated, thereby providing the UE with a reduced transmission power level that is still higher than the Common_SG.

Figure 6:
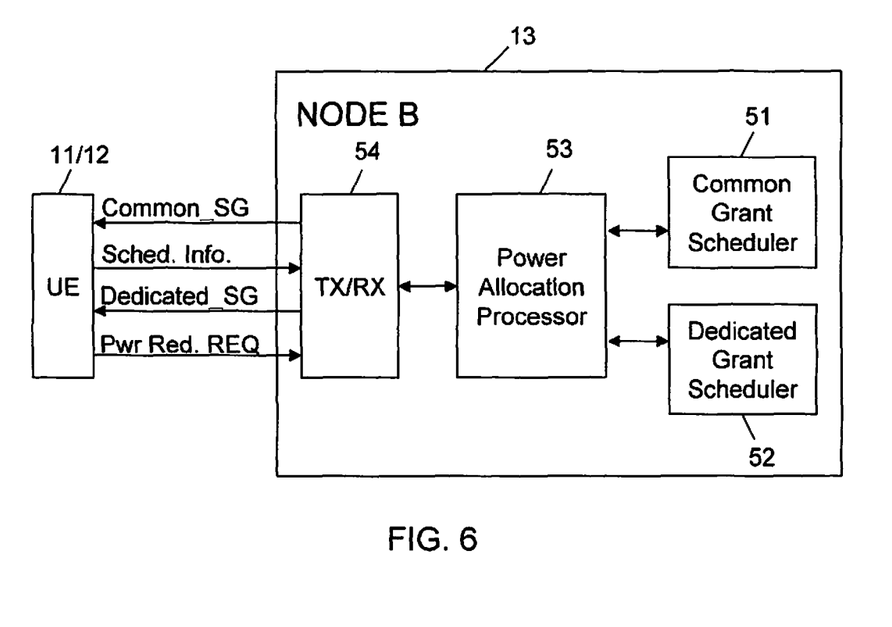
FIG. 6 is a simplified block diagram of an exemplary Node B illustrating components for implementing an embodiment of the present invention.

FIG. 6 is a simplified block diagram of an exemplary Node B 13 illustrating components for implementing an embodiment of the present invention. The Node B includes a common grant scheduler 51, a dedicated grant scheduler 52, a power allocation processor 53, and a transceiver 54. The common grant scheduler schedules the Common_SG, which the power allocation processor allocates and sends to the UE 11/12. When the UE needs to increase power, it sends Scheduling Information to the Node B. The dedicated grant scheduler then schedules a Dedicated_SG. The power allocation processor allocates the Dedicated_SG to the requesting UE if resources are available, and may reduce the Common_SG for other UEs.

At a later time, the UE 11/12 may overheat and send a Power Reduction REQ signal to the Node B 13. The power allocation processor 53 and the dedicated grant scheduler 52 remove the Dedicated_SG for the requesting UE and send an instruction to the UE to reduce power to the current Common_SG. The power allocation processor 53 and the common grant scheduler 51 then recalculate the Common-SG and send an updated Common_SG to the UE. In some circumstances, rather than totally removing the Dedicated_SG, the power allocation processor 53 and the dedicated grant scheduler 52 may recalculate a smaller Dedicated_SG for the requesting UE and send a modified Dedicated_SG to the UE. This may be done, for example, when the power reduction requested by the UE is smaller than the Dedicated_SG previously allocated. As a result, the requested power level for the UE is still higher than the level of the Common_SG. In any case, when the Dedicated_SG is modified, the Node B recalculates the Common_SG and sends it to all affected UEs.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of controlling thermal energy generation in a first mobile transceiver operating in a radio telecommunication network, wherein said thermal energy generation is directly proportional to a transmit power level in the mobile transceiver, and a network node allocates transmit power levels to a plurality of mobile transceivers through scheduling grants, said method comprising the steps of:

allocating by the network node, a first common scheduling grant to the plurality of mobile transceivers, the first common scheduling grant authorizing each of the mobile transceivers to transmit at a first common power level;

receiving by the network node, a request from the first mobile transceiver to increase transmit power;

allocating by the network node, a dedicated scheduling grant to the first mobile transceiver in response to the request to increase transmit power, said dedicated scheduling grant authorizing the first mobile transceiver to transmit at a higher dedicated transmit power level;

allocating by the network node, a second common scheduling grant to mobile transceivers other than the first mobile transceiver, the second common scheduling grant authorizing each of the mobile transceivers to transmit at a second common power level lower than the first common power level and offsetting the dedicated grant allocated to the first mobile transceiver;

subsequently receiving by the network node, a request from the first mobile transceiver to decrease transmit power due to an overheat condition in the mobile transceiver;

removing by the network node, the dedicated scheduling grant from the first mobile transceiver in response to the request to decrease transmit power; and allocating by the network node, a third common scheduling grant to the plurality of mobile transceivers, the third common scheduling grant authorizing each of the mobile transceivers to transmit at a third common power level higher than the second common power level and reallocating the dedicated grant within the third common scheduling grant.

* * * * *